(12) United States Patent
Pfisterer (10) Patent No.: US 9,179,589 B2
(45) Date of Patent: Nov. 10, 2015

(54) SOIL PLUG PROCESSING MECHANISM

(75) Inventor: Thomas Pfisterer, Ingbert (DE)

(73) Assignee: Weidenmann GmbH, Ulm (DE)

( * ) Notice: Subject to any disclaimer, the term of this patent is extended or adjusted under 35 U.S.C. 154(b) by 451 days.

(21) Appl. No.: 13/464,123

(22) Filed: May 4, 2012

(65) Prior Publication Data

US 2012/0279904 A1    Nov. 8, 2012

(30) Foreign Application Priority Data

May 6, 2011   (DE) .......................... 10 2011 075 472

(51) Int. Cl.
*B07B 1/22*      (2006.01)
*A01B 45/04*     (2006.01)
*A01B 45/02*     (2006.01)

(52) U.S. Cl.
CPC ............... *A01B 45/04* (2013.01); *A01B 45/023* (2013.01); *B07B 1/22* (2013.01)

(58) Field of Classification Search
CPC .............. B07B 1/22; B07B 1/24; B07B 1/26; B07B 13/16; A01B 45/02; A01B 45/023
USPC ........ 209/2, 288, 289, 406, 906, 922; 172/21, 172/22, 32
See application file for complete search history.

(56) References Cited

U.S. PATENT DOCUMENTS

| | | | | |
|---|---|---|---|---|
| 1,873,220 A | * | 8/1932 | Sells | 209/289 |
| 1,930,890 A | * | 10/1933 | Wallace | 209/257 |
| 3,667,814 A | * | 6/1972 | Kirvda | 406/62 |
| 3,804,245 A | * | 4/1974 | Pendleton | 209/240 |
| 3,910,837 A | * | 10/1975 | Good | 209/461 |
| 4,005,755 A | * | 2/1977 | Bakke et al. | 172/32 |
| 4,359,383 A | * | 11/1982 | Sweet | 209/479 |
| 5,816,336 A | | 10/1998 | Underhill | |
| 6,019,227 A | * | 2/2000 | May, III | 209/284 |
| 7,836,972 B2 | * | 11/2010 | Pavlik | 175/20 |
| 8,051,917 B2 | | 11/2011 | Wiedenmann | |
| 2002/0056555 A1 | | 5/2002 | Underhill | |
| 2003/0066661 A1 | | 4/2003 | Simon | |
| 2003/0146137 A1 | * | 8/2003 | Bichel et al. | 209/288 |
| 2005/0178567 A1 | | 8/2005 | Wiedenmann | |

(Continued)

FOREIGN PATENT DOCUMENTS

| | | |
|---|---|---|
| DE | 10 72 422 B | 6/1960 |
| DE | 40 07 409 A1 | 9/1991 |
| DE | 10 2005 021 025 A1 | 10/2006 |

(Continued)

OTHER PUBLICATIONS

Office Action of the corresponding German Patent Application No. 10 2011 075 472.5, dated Mar. 5, 2012.

(Continued)

*Primary Examiner* — Joseph C Rodriguez
*Assistant Examiner* — Kalyanavenkateshware Kumar
(74) *Attorney, Agent, or Firm* — Global IP Counselors, LLP (57) ABSTRACT

A soil plug processing mechanism for processing soil plugs which occur during ground maintenance. The soil plug processing mechanism having a separating device for picking up and processing the soil plugs by separating the soil plug material into fine particles and coarse particles. The separating device has at least one rotatable rotary sieve which has a rotatably driveable sieve drum with an outside surface which is configured at least partially as a sieve area.

19 Claims, 10 Drawing Sheets

(56) References Cited

U.S. PATENT DOCUMENTS

2010/0294523 A1    11/2010  Wiedenmann
2012/0285868 A1*   11/2012  Sierens et al. ............... 209/289

FOREIGN PATENT DOCUMENTS

| | | |
|---|---|---|
| DE | 10 2008 017 242 A1 | 10/2009 |
| EP | 1 505 862 B2 | 5/2005 |
| GB | 1 482 418 | 8/1977 |
| WO | WO-03/096784 A1 | 11/2003 |

OTHER PUBLICATIONS

The German Office Action for the corresponding German patent application No. 10 2011 075 472.5, issued on May 26, 2014.

* cited by examiner

SOIL PLUG PROCESSING MECHANISM

CROSS-REFERENCE TO RELATED APPLICATIONS

This application claims priority under 35 U.S.C. §119(a) to German Patent Application No. 10 2011 075 472.5, filed in Germany on May 6, 2011, the entire contents of German Patent Application No. 10 2011 075 472.5 are hereby incorporated herein by reference.

BACKGROUND

1. Field of the Invention

The present invention relates to a soil plug processing mechanism and to a ground maintenance machine and/or cleaning machine having such a soil plug processing mechanism. In addition, the present invention relates to particular parts for such a soil plug processing mechanism or such a machine.

2. Background Information

Soil plugs are created within the framework of ground maintenance, for example when the ground is being maintained using hollow spiking tools such as hollow spoons during deep loosening. In the case of a ground maintenance machine for the deep loosening of soils, such as is described, for example, in DE 10 2008 017 242 A1, DE 10 2005 021 025 A1 or EP 1 505 862 B1 or WO 03/096784 A1, it is possible to use hollow tines as tools for the deep loosening, such hollow tines pulling soil plugs with them once they are pulled out of the ground and depositing them on the soil. The machines engage in the ground by way of hollow tines and remove soil plugs which remain lying on the surface of the ground.

The term "soil plug" does not have to designate a plug shape. The term refers to pieces of earth and soil materials (e.g. with vegetation or roots) which are dug out of the earth to insert holes. These pieces do not have to be absolutely plug-shaped, even if the plug shape is a frequent shape that appears. The term "soil plug" is to be understood synonymously with the term "soil core".

On many sports grounds or other grassed areas, said soil plugs have to be arduously collected in by hand and disposed of once the holes have been inserted by machine. Accordingly, in the prior art and in practice there are essentially two methods of dealing with such soil plugs. One method is to pick up and dispose of all the soil plugs. Another method is to pick up the soil plugs and to break them up completely in order then to distribute all the material of the soil plug onto the ground again. To this end, the material is chopped small and is deposited onto the ground again in a corresponding manner.

There are already machines for picking-up soil plugs which pick up the soil plugs using a brush and then process them in a corresponding manner. The brushes sweep the soil plugs up of the ground and are also referred to as sweeping brushes. Known soil plug processing machines are shown, for example, in U.S. Pat. No. 5,816,336, U.S. Patent No. 2003/0066661, GB 1 482 418 and U.S. Patent Application No. 2002/0056555.

Separating the soil plugs into organic materials and anorganic materials such as sand has already been proposed in part in the previously mentioned prior art. The sand is able to be re-distributed on the ground, it being possible to collect the organic materials and to supply them to a separate treatment or for disposal. The separating is effected by sieves which are fastened on the machine chassis and are provided with corresponding impinging elements or vibrating elements.

SUMMARY

A disadvantage of the known machines is that the design of the machines is unwieldy and they are not comfortable to operate. The known separating devices result in high levels of vibration and in signs of a great deal of wear and tear on sieves and moving parts. The separating devices quickly become contaminated and have to be cleaned in an arduous manner.

An object of the invention is to create a soil plug processing mechanism which is improved with regard to ease of operation. This object can be achieved by a soil plug processing mechanism according to the embodiments described herein. Advantageous applications of such a soil plug processing mechanism and parts and units for such a soil plug processing mechanism correspondingly adapted for increased ease of operation are also described, as well as advantageous developments.

The disclosed embodiments create a soil plug processing mechanism for processing soil plugs (soil cores) which occur during ground maintenance. The soil plug processing mechanism has a separating device for the picking up and processing of the soil plugs (soil cores) by separating the soil plug material into fine particles and coarse particles, wherein the separating device has at least one rotatable rotary sieve which is realized as a rotatingly driveable sieve drum with an outside surface which is realized at least partially as a sieve area. In the case of an advantageous development, it is provided that the at least one rotary sieve is mounted so as to be removable and exchangeable without the use of tools. Also, at least one rotary sieve is mounted so as to be adjustable and/or movable with reference to the inclination of the axes of rotation, and the rotary sieve has at least one circumferential bearing region for support on roller elements and/or at least one circumferential drive region for engaging with a rotatingly driven rotary member for driving the rotational movement.

In addition, the bearing region is circumferentially out-of-round. Also, the bearing region is at an axial spacing to the drive region, and can be on an outer region of the sieve area of the outside surface. Also, the drive region has a circumferential ring gear for engagement with a gear wheel. A set of different rotary sieves with variously developed sieve areas and/or with different components is provided, from which the rotary sieve to be used can be selected. At least one rotary sieve has an opening on each of its two axial end faces, wherein a first of the openings is realized for picking up the soil plugs and a second of the openings is realized for discharging the coarse particles. Also, several rotary sieves are arranged side by side so as to be rotatable.

A rotary sieve drive device for driving the several rotary sieves has at least one actively driven driving rotary member for driving a first rotary sieve and at least one passively rotatably mounted intermediate rotary member which is in engagement with two adjacent rotary sieves at the same time in order to transmit the rotational movement of the one rotary sieve to the other rotary sieve. Also, the rotary sieve bearing device for the rotatable bearing arrangement of the at least one rotary sieve has a rotary sieve frame which is held so as to be movable on a chassis of the soil plug processing device. Furthermore, the rotary sieve bearing device has a displacement device for displacing the rotary sieve frame in relation to the chassis. The rotary sieve bearing device can have a pivoting device for pivoting the rotary sieve frame in relation to the chassis. In addition, the rotary sieve bearing device has an axial guiding device for limiting or preventing an axial movement of the at least one rotary sieve in relation to the rotary sieve bearing device.

According to a further aspect, the invention relates to a soil plug processing mechanism, in particular according to one or more of the preceding developments, said soil plug processing mechanism having a plug picking up device for picking up the soil plugs and for discharging the soil plugs into a separating device for separating the soil plug material into fine particles and coarse particles. The separating device preferably has at least one rotary sieve.

The plug picking up device can be mounted so as to be movable up and down in relation to a chassis and that a manual guiding device for the manual guiding of the soil plug processing mechanism over the ground is provided and that the manual guiding device is connected to the plug picking up device in such a manner that the plug picking up device is movable up and down by the manual guiding device. Also, a fine particle removal device can be provided for removing and depositing the fine particles on the ground, as well as a coarse particle container for picking up the coarse particles for the purposes of subsequent disposal.

According to a further aspect, the invention also relates to the rotary sieve per se, which is suitable, in particular, for a soil plug processing mechanism according to the invention. The rotary sieve preferably has one or more of the features described previously in conjunction with the description of the rotary sieve of the soil plug processing mechanism.

In addition, the invention relates to a ground maintenance machine, in particular a cleaning machine, which is mobile or couplable or attachable to a vehicle, with the machine having a soil plug processing mechanism according to the invention or to one of its advantageous developments.

The invention also relates to a belt tightening mechanism for a belt drive, which can be used with such a ground maintenance machine or cleaning machine and/or with such a soil plug processing mechanism, for driving a rotary element, which is mounted so as to be movable in relation to a drive unit, with a guide roller which is mounted on a toggle lever, wherein the toggle lever is mounted at the one end on a carrying part which has the drive unit and at the other end on a carrying part which has the rotary element in order to be deflected by the relative movement of the carrying parts for tightening the belt run, in particular the taut belt run, of the belt, which is guided about the guide roller. The soil plug processing mechanism can be provided with a movable plug picking up device is provided with such a belt tightening mechanism for tightening a drive belt for the plug picking up device.

A newly developed separating device can be provided as the core unit of the soil plug processing mechanism of the type according to the invention. The new separating device operates with at least one rotary sieve. Such a rotary sieve has a drum-like shape, an outside surface of said drum being realized at least partially as a sieve area. The rotary sieves are mounted in the soil plug processing mechanism so as to be rotatably driven. The soil plugs are inserted into the at least one rotary sieve, which at least one rotary sieve is set to rotate. There are preferably several rotary sieves present. Furthermore, the rotary sieves are arranged side by side and have axes of rotation which are aligned substantially with respect to each other (e.g. axes of rotation which are arranged substantially parallel to each other). Through an arrangement of several rotary sieves side by side, a larger operating width is able to be covered. One axis of rotation is preferably aligned in the direction of movement of the soil plug processing mechanism.

The at least one rotary sieve rotates, coarse particles remaining in the interior of the rotary sieve and smaller fine particles passing right through the sieves. In the case of soil plugs, organic materials essentially remain in this case in the interior as coarse particles, whilst sand particles or other soil particles pass right through the sieve area and are deposited in a distributed manner onto the ground, for example, by a fine particle removal device. A distribution of the fine particles, such as, in particular, sand, is supported by the rotation of the rotary sieves, as a result of which the fine particles, acted upon by centrifugal force, exit from the rotary sieve at different points and are ejected in a randomly distributed manner. The coarse particles, i.e., in particular, the organic material, are temporarily stored, for example, in a coarse particle container. The coarse particle container is stored so as to be removable. The organic material can be emptied, for example, by drawers, raised emptying or in another manner. Thus, separation of sand and organic material can be achieved in a convenient manner.

An advantage of a rotary sieve as compared to known separating devices is, in particular, the particularly smooth running as fewer vibrations than in the case of vibratory sieves or the like can occur through the rotational movement. Rotary sieves are preferably able to be removed, replaced and cleaned in an easy manner. For example, it is possible to provide several sets of rotary sieves with various grating arrangements, various grating mesh diameters, various shapes etc. In conjunction with a rotary sieve, it is also possible to provide active and passive processing elements, such as scrapers, blade elements arranged in the interior of the rotary sieves or other manipulating elements, such as brushes, impact elements or the like.

In addition, a bearing region, by way of which the rotary sieve is movably mounted on roller elements, has an out-of-round shape. The rotary sieve is mounted, for example, by way of its sieve outside surface on rollers such that the corresponding circumferential region of the sieve outside surface acts as a bearing region. If the sieve outside surface with the sieve area is then developed so as to be out-of-round, on the one hand this has considerable advantages for the production, as production of a circumferential sieve drum is achievable by individual bends of a flat sieve grating, on the other hand moving the out-of-round sieve drum outside surface over roller elements, acts like a striking mechanism to set the rotary sieve itself into shaking movements. When rotating over the out-of-round shape there is then additionally a vibratory movement which supports the separating procedure. For example, the outside surface of the sieve drum is realized as a prism which has several flat surfaces on its circumferential region. Each time a rotary sieve moves over the supporting rollers by way of an edge between said surfaces, there is a small impact onto the rotary sieve, which supports the separating procedure.

In addition to a bearing region, in an advantageous manner the rotary sieve also has a round drive region, by which the rotary sieve is rotatingly driveable. The round drive region can include, for example, a row of teeth running all the way around or a gear ring. Through engagement of a gear wheel as drive member, the rotary sieve can be set to rotate. The rotary sieve drive device can have an actively driven driving rotary member, such as, for example, a driving toothed wheel, which is connected or connectable, e.g. couplable to an engine or the like (e.g. power take-off shaft), and at least one intermediate rotary member, such as, for example, a toothed wheel which is mounted so as to rotate freely. In such a manner, a whole row of rotary sieves arranged in parallel can be driven in a simple manner by placing an intermediate toothed wheel, which is driven by the respectively driven rotary sieve and also drives the adjacent rotary sieve, between each adjacent rotary sieve.

The at least one rotary sieve or the majority of rotary sieves are preferably rotatably mounted in a rotary sieve bearing device in such a manner that the rotary sieves are movable in relation to a chassis of the soil plug processing mechanism. For example, there is provided a rotary sieve frame on which the rotary sieves are rotatably mounted. The rotary sieve frame is preferably mounted on the chassis so as to be pivotable and/or displaceable. By displacement, the rotary sieve can be moved, for example, out of an operating position in the machine into a handling position, where the rotary sieve is easily accessible, for example in order to exchange and/or clean the rotary sieve. An inclination of the axes of rotation is preferably able to be adjusted by pivoting the rotary sieve frame.

The rotary sieves are preferably developed in such a manner that they have an opening at both axial ends. The soil plugs can be introduced through a first opening and the coarse particles can be discharged through a second opening. The type of output and the conveying of the coarse particles and also the separation can be influenced by adjusting the axis of rotation. The inclination of the axes of rotation is preferably automatically adapted to a position of the chassis. For example, a rotary sieve bearing frame is attached in a floating manner such that when there is a change in the inclination of the chassis on account of travelling over inclined ground, the displacement of weight leads to the inclination of the axes of rotation being adapted. It is particularly preferred for the at least one rotary sieve to be removable and/or exchangeable without the use of tools. This can be achieved, for example, by the rotary sieve resting on bearing elements, such as supporting rollers and rotary members, and being simple to remove by lifting, in particular, in the handling position.

Preferably, an axial guiding device is provided which limits or avoids an axial movement of the at least one rotary sieve. The axial guiding device is preferably associated with the drive region and/or the bearing region. For example, a spigot and socket engagement extending in the circumferential direction can be provided. In a practical development, at least one of the rotary members has a projecting disc region for this which engages in a groove on the drive region. A drawer runner is provided, for example, as a displacement device for easy removal of the rotary sieves. Thus, for example, an entire unit of rotary sieves can be movably mounted on a drawer runner or another such displacement unit in order to achieve ease of removal and ease of manipulation.

A fastening frame for the rotary sieves is held, for example, in a drawer runner which is attached on the chassis. Displaceability is provided, for example, in the direction of travel. Thus, the at least one rotary sieve can be pushed out of the chassis in order to remove the rotary sieve or a majority of rotary sieves out of the machine. The rotary sieves can be cleaned, removed, replaced, acted on with compressed air or sprayed down with water or other cleaning fluids or treated in another way.

A coarse particle container is preferably located in the interior. The at least one rotary sieve is preferably arranged such that an open end lies above the container. The soil plugs are consequently inserted into the rotary sieves at one end, then processed in a corresponding manner by rotation of the rotary sieves, the remaining organic material exiting at said open end and falling into the coarse particle container. The container can be emptied, for example, by raised emptying.

Furthermore, the soil plug processing mechanism can be, for example, part of a ground maintenance machine, during the operation of which such soil plugs (soil cores) are created; in a further development, the soil plug processing mechanism is part of a cleaning machine in order to clean soil plugs or other material which can be treated in the same way (e.g. sweepings) from an area of ground. In both cases, a plug picking up device can be provided for picking up the soil plugs and for inserting the soil plugs into the separating device. The plug picking up device is preferably movable up and down in relation to the chassis in order, in this manner, to start a plug pick up or to put it out of operation. The plug picking up device preferably has a rotatingly driven element, such as, for example, a brush roller or the like in order to pick soil plugs up from the ground. The machine including the soil plug processing mechanism can be realized so as to be attached to a vehicle, as a trailer or as a trailed unit. In another development, the machine can be mobile, for example as a self-propelling vehicle. According to one development, the machine is realized as a pushing machine which means that an operator walks behind the machine.

In addition, there is preferably provided a manual guiding device for manually guiding the machine or the soil plug processing mechanism over the ground. For example, there is a handle for operating and steering the machine. The handle is preferably pivotably mounted. The manual guiding device, as in particular a handle, can also serve for the purpose of raising the machine or the plug picking up device at the front in order, in this way, to remove a pick up unit of the plug picking up device, that is to say, for example a brush, from the ground. With the plug picking up device raised, a pure travelling movement can be carried out, for example, without any pick up action. The pick up unit can preferably be moved back into contact with the ground by the manual guiding device in order to pick up the soil plugs. The manual guiding device provided, for example, with a handle preferably has operating elements, such as, for example, operating elements for an engine or the like. The manual guiding device, for example a handle of the same, can be completely folded to the rear in order, in this way, to move the machine, for example, in reverse. Thus, for example, the machine can be moved to a conveying vehicle or an unloading point in order to empty the coarse particle container. Raised emptying is preferably provided, raising the coarse particle container and tilting it into a raised position in order to tip it out from above in this way. Such raised emptying could be realized, for example, in the manner described in DE 41 29 640 C2.

A rotary sieve bearing device can preferably be pivoted inside the machine in order to adapt the inclination of the rotary sieves mounted therein. For example, there is a manual pivoting device. To this end, for example, a drawer runner is pivotably mounted at one end and is pivotably guided in a curved guide by a certain angle at another end. Fixing can be realized at said pivotably guided end, for example the inclination can be fixed by an adjusting screw or by insertion into corresponding locking devices. Automatic pivoting for adapting to ground conditions is also provided in place of or in addition to the manual pivoting movement. For example, a cardanic pivoting possibility is provided. Such pivoting serves to adapt to inclinations with respect to the ground such that it is possible to align the rotary sieves as horizontal as possible or, if desired, as inclined as possible.

As already explained above, in the case of an advantageous development it is provided that the plug picking up device is movable in relation to a chassis. This can be achieved, for example, by pivoting a handle which is also provided for manually guiding the machine. The handle can be mounted for this purpose so as to be pivotable about an axis transversely to the machine, a further lever arm of the handle cooperating with a vertically adjustable bearing arrangement for a pick up unit. Through the vertically adjustable bearing arrangement, the pick up unit is movable in relation to the chassis and can be moved downwards from the chassis in the direction of the ground or by movement towards the chassis or into the chassis can be moved away from the ground. The movement can be achieved in an advantageous manner by the manual guiding device, in particular by a guiding handle.

The pick up unit is driven, for example, by an endless belt and chain drive. A belt transmission can be present. As the drive device is movably mounted in order to enable contact with or disconnection of the picking up movement, such a belt and chain drive can be troublesome. In particular, whenever a traction mechanism belt run exerts corresponding tension, the tension is also transmitted to the mobility of the bearing arrangement for the picking up device.

According to a further aspect of the invention, a solution to this is provided which compensates for the tension of the traction belt run and supports by a connecting lever. To this end, a belt tightening mechanism, which can be used with the soil plug processing mechanism, preferably has a toggle lever structure. One lever is preferably mounted on the chassis, whilst a further lever is coupled to the bearing arrangement of the pick up unit. If the bearing arrangement is moved for bearing the pick up unit, the toggle lever linkage is consequently also moved. A deflecting mechanism for a traction mechanism belt run sits on the toggle lever linkage. If tension is exerted onto the traction mechanism belt run rerouted there, said tension is supported by the toggle lever structure, which means that the tension of the traction mechanism belt run has no influence on the bearing arrangement of the pick up unit and consequently also no influence on the manual guiding unit connected thereto.

This possibility of compensating for the traction mechanism belt run is also of interest for other ground maintenance machines. In particular, the solution is of interest in the case of a manually guided multi-regeneration head on which ground maintenance tools are rotatably driven and are movable manually in relation to the machine by a manipulating unit. The machine can be manually guided overall or it can also be realized as a machine to be attached to a vehicle, for example for a three-point suspension of a tractor.

Consequently, the invention relates, in particular, to a separating device with at least one rotary sieve, in an advantageous manner with several rotary sieves. The rotary sieves are preferably pivotable and able to be pulled out. In an advantageous manner, the rotary sieves are arranged parallel to each other and are mounted tangentially on supporting rollers which are mounted in a frame. The frame for the rotary sieves is preferably mounted in the machine so as to be horizontally pivotable. The inclination of the frame is preferably steplessly adjustable. The frame is preferably sardonically mounted in order to align automatically when the machine tilts. The frame is preferably mounted so as to be displaceable in the machine; in particular in such a manner that the frame with the rotary sieves resting thereon is arranged so as to be able to be pulled out in the manner of a drawer.

The at least one rotary sieve is preferably mounted in a tangential manner on supporting rollers. The supporting rollers preferably have an end-face toothing which engages into an end-face toothing of the sieve drum. An outer supporting roller is preferably driven as a driving rotary member. The toothing of a sieve drum is preferably connected in an identical manner to the sieve drum lying next to it by the toothing of a supporting roller which serves as an intermediate rotary member. The supporting roller which acts as an intermediate rotary member is preferably arranged between two sieve drums such that it forms a common supporting roller for two sieve drums lying side by side. Apart from the toothing, the supporting rollers also preferably have an end-face supporting surface on which the sieve drums rest and roll off.

The direction of rotation of the drive wheel is preferably selected in such a manner that the tangential force of the drive wheel does not lift the sieve drum out of the toothing. The sieve drums can preferably be lifted up from the supporting rollers without the use of any tools. The supporting rollers preferably have guide elements which secure the sieve drums in an axial manner.

The machine preferably has a regeneration head which is mounted so as to be pivotable about a horizontal axis which is arranged transversely with respect to the framework of the machine. The regeneration head is preferably connected to a handle which is mounted so as to be pivotable about the identical horizontal axis. The handle is preferably connected detachably to the regeneration head. The angular movement of the handle and the regeneration head preferably extends in a synchronous manner. The handle preferably lies opposite the mower head and preferably, in the form of a rocker, serves to enable the operator to raise the regeneration head. The handle is preferably pivotable about the horizontal axis independently of the movement of the regeneration head.

The handle is preferably realized as a guiding handle for the manually guided machine. The guiding handle can preferably be arranged in a selective manner in the direction of travel behind the machine or in the direction of travel in front of the machine by corresponding pivoting. A V-belt tightening system is preferably provided for driving the drive elements on the regeneration head. A V-belt tightening system with force compensation is provided in a particularly preferred development of the machine. In general, the V-belt tightening system can be defined as a belt tightening system for machine frames which are arranged so as to be movable with respect to each other, one of which has a drive pulley and the other a driven pulley. A lever system for force compensation of the force of the taut belt run is preferably provided between the machine frames.

The taut belt run preferably runs over a guide roller which is rotatably mounted on a carrying lever. The taut belt run preferably runs over a guide roller, the carrying lever of which is mounted rotatably on part of the chassis, the guide roller being connected rotatably to one end of a support lever. The support lever is preferably mounted rotatably on the other part of the machine frame which does not accommodate the pivotal point of the carrying lever of the guide roller. The support lever and the carrying lever of the guide roller preferably together take up the force which is transmitted to the guide roller via the taut belt run. The V-belt is preferably tightened by the slack belt run, for example in such a manner that the slack belt run runs over a spring loaded tightening roller. When the position of the pulleys with respect to each other is changed, the tightening roller of the slack belt run is preferably prevented from moving resiliently, as a result of which the slack belt run is relieved and this means that the belt can no longer transmit any tractive force. Thus, when there is a relative movement of the pulleys with respect to each other, disconnection of a drive movement can preferably be achieved. This can be achieved, for example, by a stop for a lever system for the bearing of the tightening roller.

Even though the advantages and some structural features of the mechanism described here have been explained by way of its preferred intended application for processing pieces of soil, such as soil plugs, which occur during ground maintenance, the machine is not limited to the specific application. The separation of fine particles and coarse particles explained by the example of soil plugs is also useful for other areas, for example in the case of processing sweepings from floor surfaces or traffic areas or in the case of other separations of organic materials and sand.

BRIEF DESCRIPTION OF THE DRAWINGS

Exemplary embodiments of the invention are explained below by way of the accompanying drawing, in which, in detail.

DETAILED DESCRIPTION OF EMBODIMENTS

Figure 1:
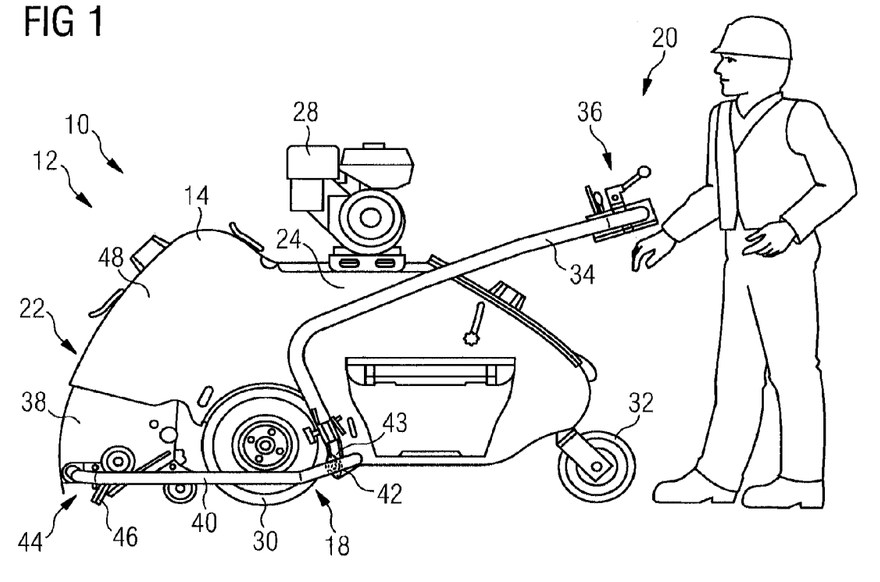
FIG. 1 shows a schematic side view of a ground maintenance machine.

The ground maintenance machine 10 shown in more detail in FIG. 1 is realized as a cleaning machine 12 (in particular, e.g. a sweeping machine) for cleaning (e.g. by sweeping) areas of ground of pieces of soil or soil cores, referred to below as soil plugs, that occur during ground maintenance. The cleaning machine 12 has a chassis 14 (basic design or machine frame) with a framework 18 and a manual guiding device 20 in order to move the cleaning machine 12 over the ground. In addition, the cleaning machine 12 has a plug picking up device 22 for picking up soil plugs and a soil plug processing mechanism 24 for processing the soil plugs picked up. In the embodiment represented, the cleaning machine 12 is realized as a self-propelling machine which has an engine 28, in particular an internal combustion engine.

Figure 9:
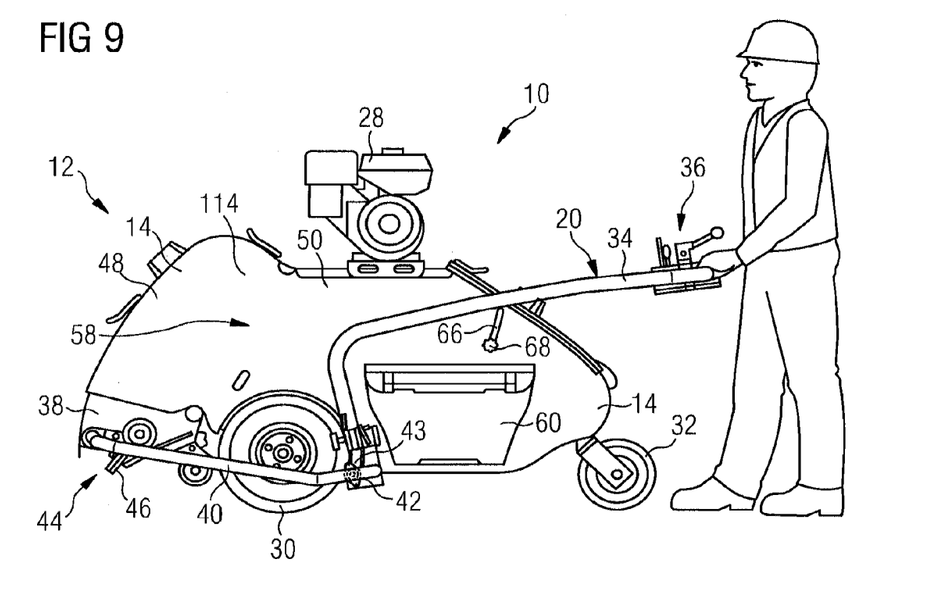
FIG. 9 shows a schematic side view of the ground maintenance machine of FIG. 1 in a mobile position.

The framework 18 has drive wheels 30 and guide rollers 32. The drive wheels 30 are connectable to the engine 28 in a usual manner (not shown in any more detail) to drive a travelling movement. The manual guiding device 20 has a handle 34 as the guiding handle, on which control elements 36 for the engine 28 and the various functions of the cleaning machine 12 are mounted. The plug picking up device 22 is mounted on a regeneration head 38 which is coupled to the chassis 14 so as to be movable up and down in relation to the chassis 14. The regeneration head 38 is mounted so as to be pivotable about a pivot axis 42 by a carrying arm 40. The regeneration head 38 is able to be pivoted upwards in such a manner in relation to the chassis 14 in order to put the plug picking up device 22 out of operation. FIG. 1 shows the operating position of the plug picking up device 22 with the regeneration head pivoted down towards the ground, and FIG. 9 shows the pure travelling position with the regeneration head pivoted upwards into the machine.

The carrying arm 40 is connected to the handle 34. The handle 34 can be pivoted downwards from the operating position shown in FIG. 1 around the pivot axis 42 into the travelling position shown in FIG. 9, with the handle striking against the carrying arm 40 and pivoting the carrying arm 40 with it. Thus, the carrying arm 40 is pivoted upwards in order to move the regeneration head 38 upwards.

The regeneration head 38 serves as a bearing arrangement for a pick up unit 44 of the plug picking up device 22. The pick up unit 44 has a rotating brush roller 46. By the brush roller 46, soil plugs can be inserted into the regeneration head 38 and conveyed through a soil plug channel 48 upwards to the soil plug processing mechanism 24. Compressed air, which is generated by the rotation of the brush roller 46, is used in particular as the conveying air flow for this purpose.

The soil plug processing mechanism 24 is explained in more detail below by way of the representation in FIGS. 4 to 8.

The soil plug processing mechanism 24 has a separating device 50 for separating fine particles and coarse particles. The separating device 50 has at least one rotary sieve 52 which is rotatingly mounted on a rotary sieve bearing device 54. In addition, the separating device 50 has a rotary sieve drive device 56 for driving the rotational movement of the at least one rotary sieve 52. The fine particles are separated from the coarse particles by the rotation of the at least one rotary sieve 52 and are guided downwards through the machine via a fine particle removal device 58 and are deposited in a distributed manner on the ground via an opening. The coarse particles 60 are deposited by the separating device 50 into a coarse particle container 60 for subsequent disposal. The rotary sieve bearing device 54 has a rotary sieve frame 62 which is mounted so as to be pivotable and displaceable in relation to the chassis 14.

Figure 2:
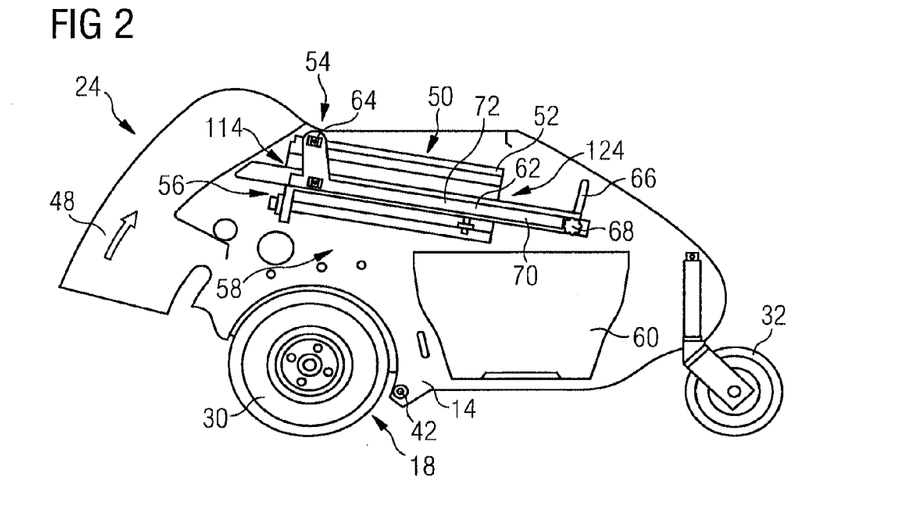
FIG. 2 shows a schematic view of a soil plug processing mechanism of the ground maintenance machine of FIG. 1.
Figure 3:
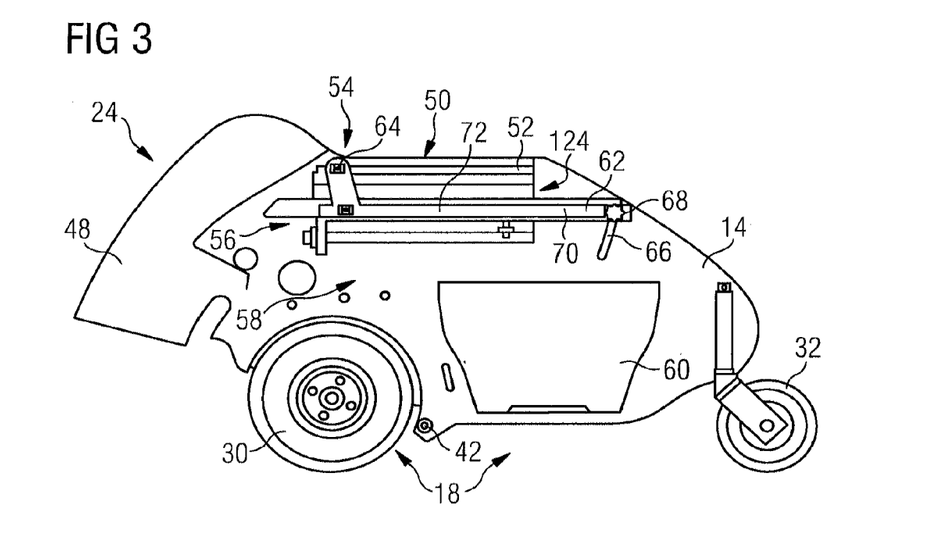
FIG. 3 shows a schematic side representation of the soil plug processing mechanism in another operating position.

FIG. 2 shows a pivot position of the rotary sieve frame 62 with an inclined rotary sieve 52 and FIG. 3 shows a pivot position of the rotary sieve frame 62 with the rotary sieve 52 arranged in an approximately horizontal manner. It can be seen that the rotary sieve 62 is mounted on the chassis 14 by way of a first end so as to be pivotable about a pivot axis 64 and by way of a second end is guided so as to be displaceable in an elongated slot guide 66 on the chassis 14 and fixable by a locking screw 68.

In addition, the rotary sieve bearing device 54 has a displacement unit 70, by which the rotary sieve frame 62 is displaceably held. The displacement unit 70 has guide rails on both sides of the machine in the manner of a drawer runner 72 in order to be able to pull the rotary sieve frame 62 out of the chassis 14 in the direction of travel of the machine.

Figure 4:
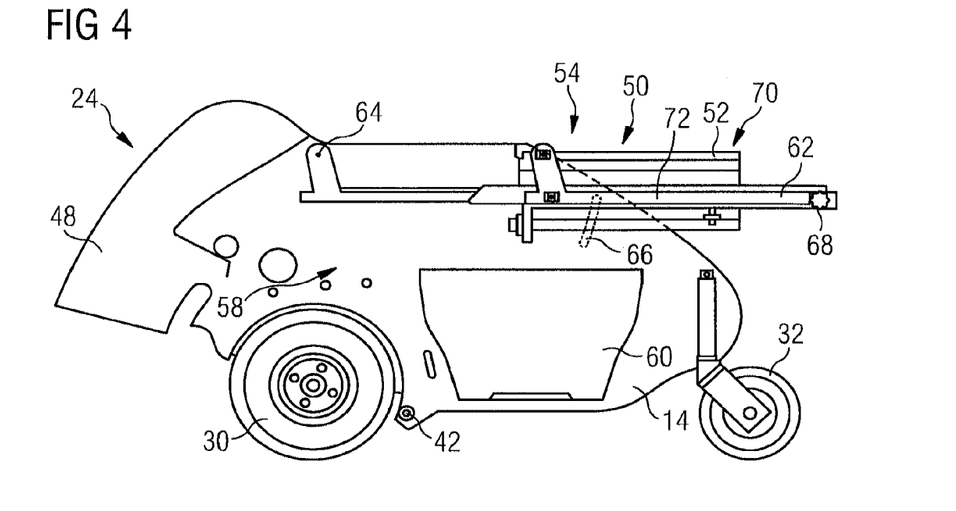
FIG. 4 shows a view comparable to that of FIG. 2 and FIG. 3 with the soil plug processing mechanism in a maintenance position.
Figure 5:
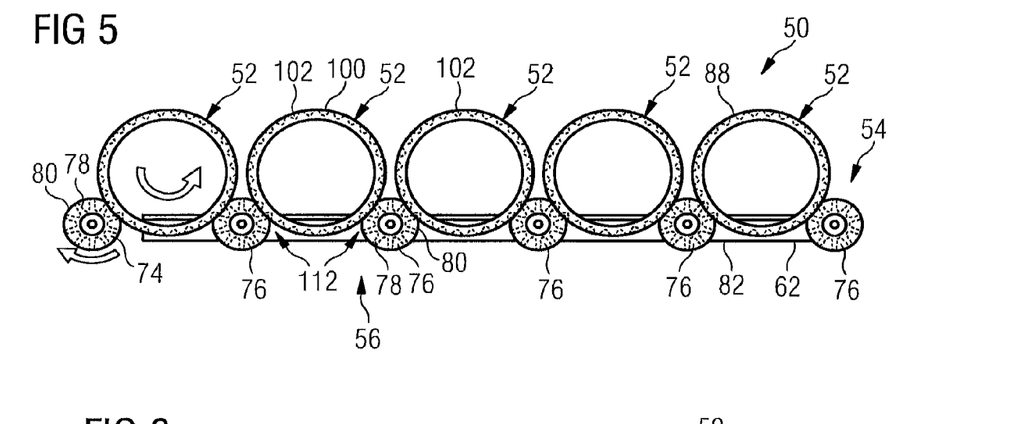
FIG. 5 shows a rear view onto a separating device of the soil plug processing mechanism.
Figure 6:
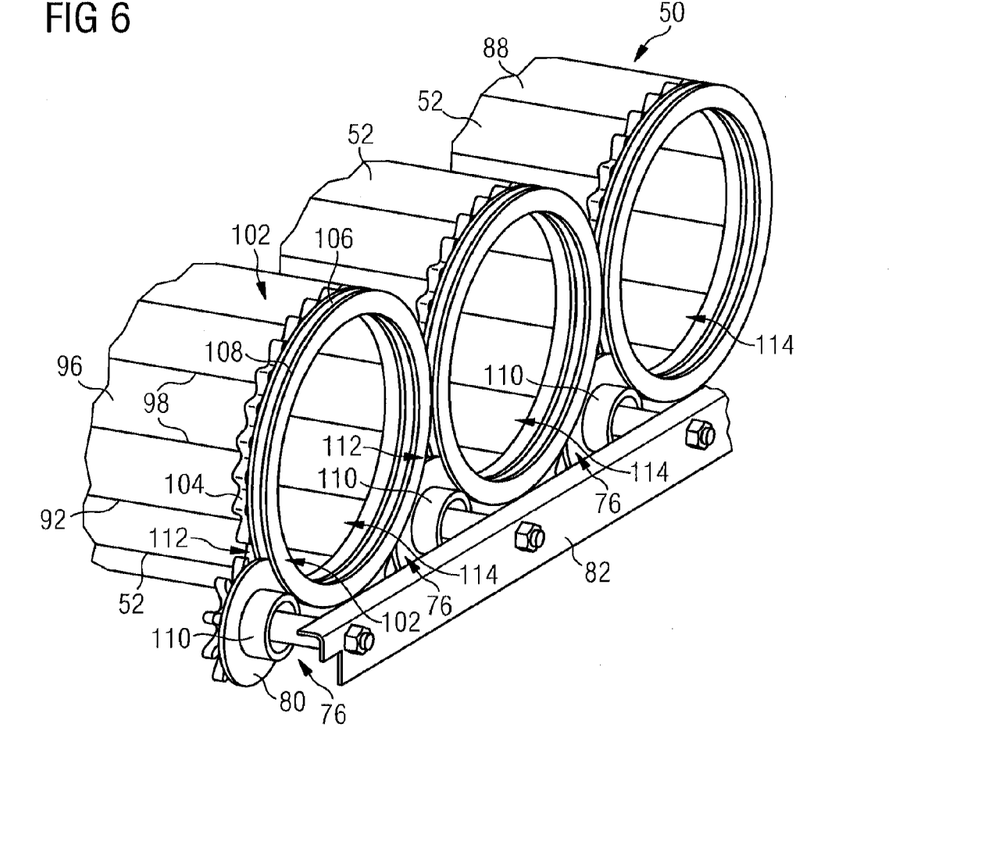
FIG. 6 shows a schematic perspective view of the separating device of FIG. 5.

FIG. 4 shows the pulled-out position of the rotary sieve frame 62 such that the at least one rotary sieve 52 held therein is easily accessible for assembly and maintenance purposes. FIGS. 5 and 6 show the rotary sieve drive device 56. In the exemplary embodiment represented, the separating device 50 has several rotary sieves 52 which are arranged side by side in a substantially parallel manner. The several rotary sieves 52 are driven together by the rotary sieve drive device 56. To this end, the rotary sieve drive device 56 has a power-driven driving rotary member 74 and several freely rotating intermediate rotary members 76.

The rotary members 74, 76, as can be seen in FIG. 6, are rotatably mounted on the rotary sieve frame 62. The rotary members 74, 76 have an end-face toothing 78 for forming a toothed wheel region and a support ring 80 which is arranged axially to the toothed wheel region offset at a spacing. The rotary members 74, 76 are mounted on a first cross member 82 of the rotary sieve frame 62. Several roller elements 86, as further support for the rotary sieves 52, are mounted so as to be freely rotatable on a second cross member 84 which is at a spacing.

As can be seen from the representations of FIGS. 5, 6, 7 and 8, the rotary sieves 52 have sieve drums 88 which are formed by a circumferential outside surface 90, which is realized as sieve area 92. To this end, the outside surface 90 has been shaped from a flat wire grating to form a prism 94 by multiple folding such that several flat grating regions 96 with bend edges 98 in between are formed on the circumferential region of the sieve drum 88. The rotary sieves 52 have a circumferential bearing region 100 for support on the roller elements 86 and a circumferential drive region 102 for the engagement of the rotary members 74, 76.

The bearing region 100 is formed by a circumferential region of the outside surface 90. As can be seen from FIG. 7, each rotary sieve 52 rolls off the roller elements 86 in this way with an out-of-round circumference. The drive region 102 is realized on an end edge of the circumference of the rotary sieve 52. The drive region 102 has a circumferential toothing in the form of a gear ring 104 and a running groove 106 which is defined by a race 108. The gear ring 104 can be moved into engagement with the toothing 78 of the rotary members 74, 76, the support ring 80 engaging in the running groove 106 and the race 108 rolling off a race surface 110 of the rotary members 74, 76, as can be seen in FIG. 6. Thus, on the one hand, a positive locking engagement with the rotary members 74, 76 is created on the drive region 102 for driving the rotational movement, on the other hand, the engagement between race 108, running groove 106, support ring 80 and race surface 110 creates a smooth rotary bearing arrangement and an axial guiding device 112 to restrict an axial movement of the rotary sieves 52.

In the following description, reference is made once again to FIG. 5. The driving rotary member 74 is connectable to the engine 28 (in a manner not shown in any more detail) in order to drive the driving rotary member 74 in a rotating manner powered by an engine. The direction of rotation of the drive member, in this case, is such that when the first rotary sieve 52 is driven the rotary sieve 52 is acted upon towards the bottom. As can be seen in the representation of FIG. 5, the rotary sieves 52 rest horizontally on the rotary members 74, 76 and the roller elements 86 and can be removed simply by being lifted up. An intermediate rotary member 76 is arranged in each case between adjacent rotary sieves 52, said intermediate rotary member being driven by the driven movement of the one rotary sieve 52 and transmitting said rotational movement to the adjacent rotary sieve 52. Thus, by driving only the one driving rotary member 74, the rotational movement is transmitted by the rotary sieves 52 and the intermediate rotary members 76 connected in between along the entire chain of rotary sieves 52. The rotary sieves 52 are open at both axial ends, soil plugs being able to be introduced into the interior of the rotary sieves 52 through a first opening 114. To this end, the soil plug channel 48 opens out towards the first opening 114 of the rotary sieve 52 in use.

Figure 7:
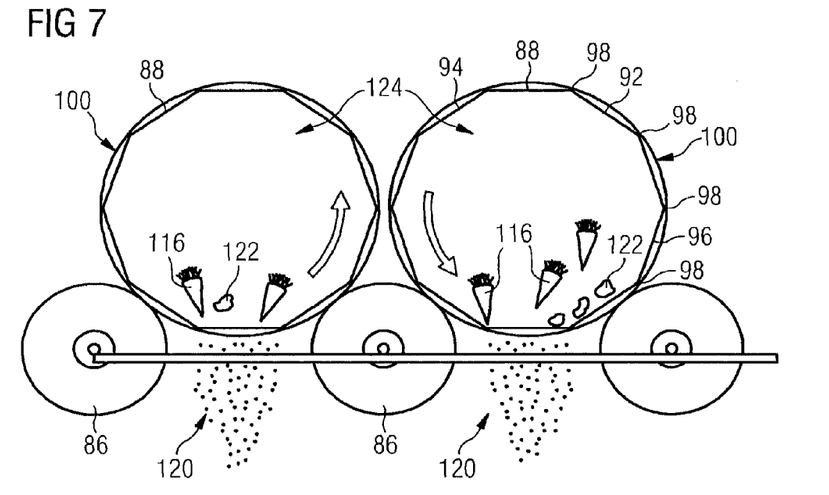
FIG. 7 shows a schematic front view of a detail of the separating device.

FIG. 7 shows the soil plugs 116 situated inside the rotary sieves 52. The soil plugs 116 are moved inside the rotary sieves by the rotational movement such that the fine particles 120 are separated off and fall out downwards through the sieve area 92. This separation is supported by the out-of-round running of the outside surface 90, formed into a prism 94, on the roller elements 86 and the slight inclination on the outside surface 90 this brings about. In addition, the air flow created by the brush roller 46 is directed through the soil plug channel 48 into the interior of the rotary sieves 52 and then via the sieve area 92 through the fine particle removal device 58, which is realized as a wide channel, back to the ground, which further supports the separating off and removal as well as the distribution of the fine particles.

Figure 8:
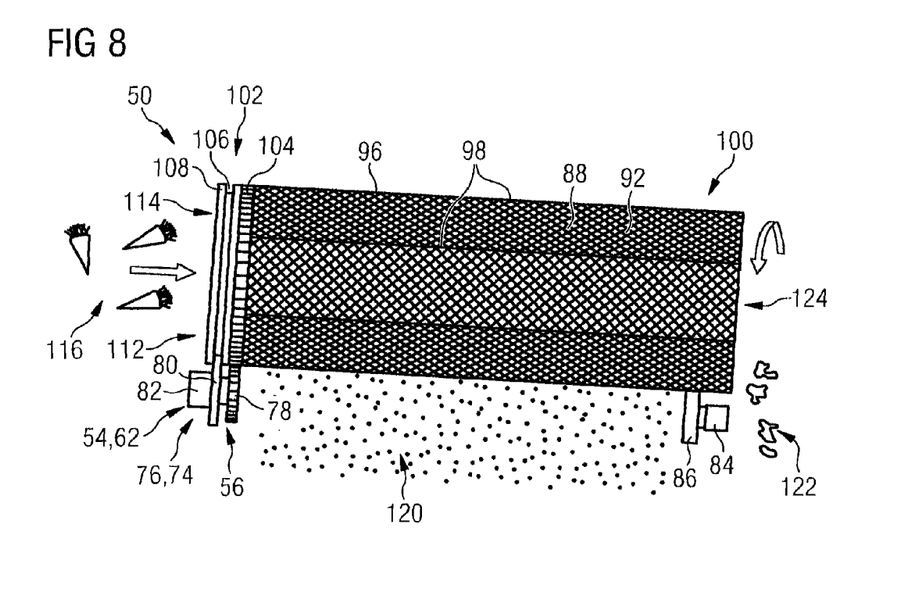
FIG. 8 shows a schematic side view onto a rotary sieve which is used with the separating device according to FIGS. 5 to 7.

As can be seen from the representation of FIG. 8, the coarse particles 122 subsequently exit from the second opening 124. As can be understood from the representation of FIG. 2, said second opening 124 lies above the coarse particle container 60 such that the coarse particles 122 are ejected into the coarse particle container 60 and are temporarily stored.

Figure 10:
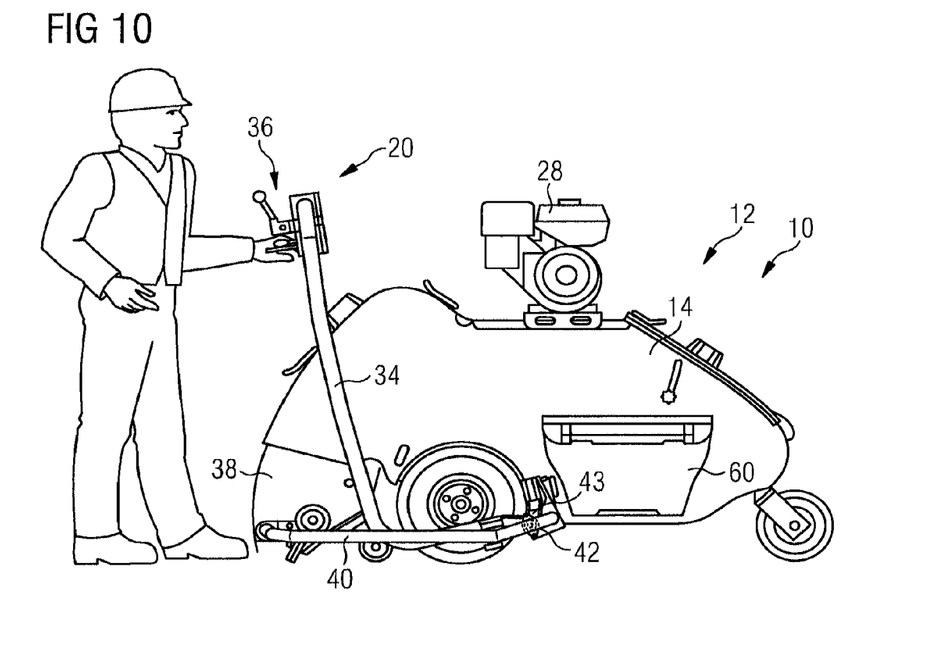
FIG. 10 shows the ground maintenance machine of FIG. 9 in a further mobile position.

FIG. 9 shows the coupled pivot possibility of the handle 34 already mentioned above. By pivoting the handle 34 downwards, the carrying arm 40 is pivoted upwards such that the regeneration head 38 is pivoted upwards. FIG. 9 shows the cleaning machine 12 with the regeneration head 38 pivoted upwards. In this position the cleaning machine 12 can be moved without the ground being acted upon by the plug picking up device 22. If, contrary to this, the handle 34 is pivoted upwards in the other direction about a pivot axis 43 which is arranged offset to the regeneration head pivot axis 42, it can be pivoted completely rearwards behind the vehicle, as is shown in more detail in FIG. 10. In this position, the cleaning machine 12 can be operated from behind and can be moved, for example, rearwards towards an unloading point.

Figure 11:
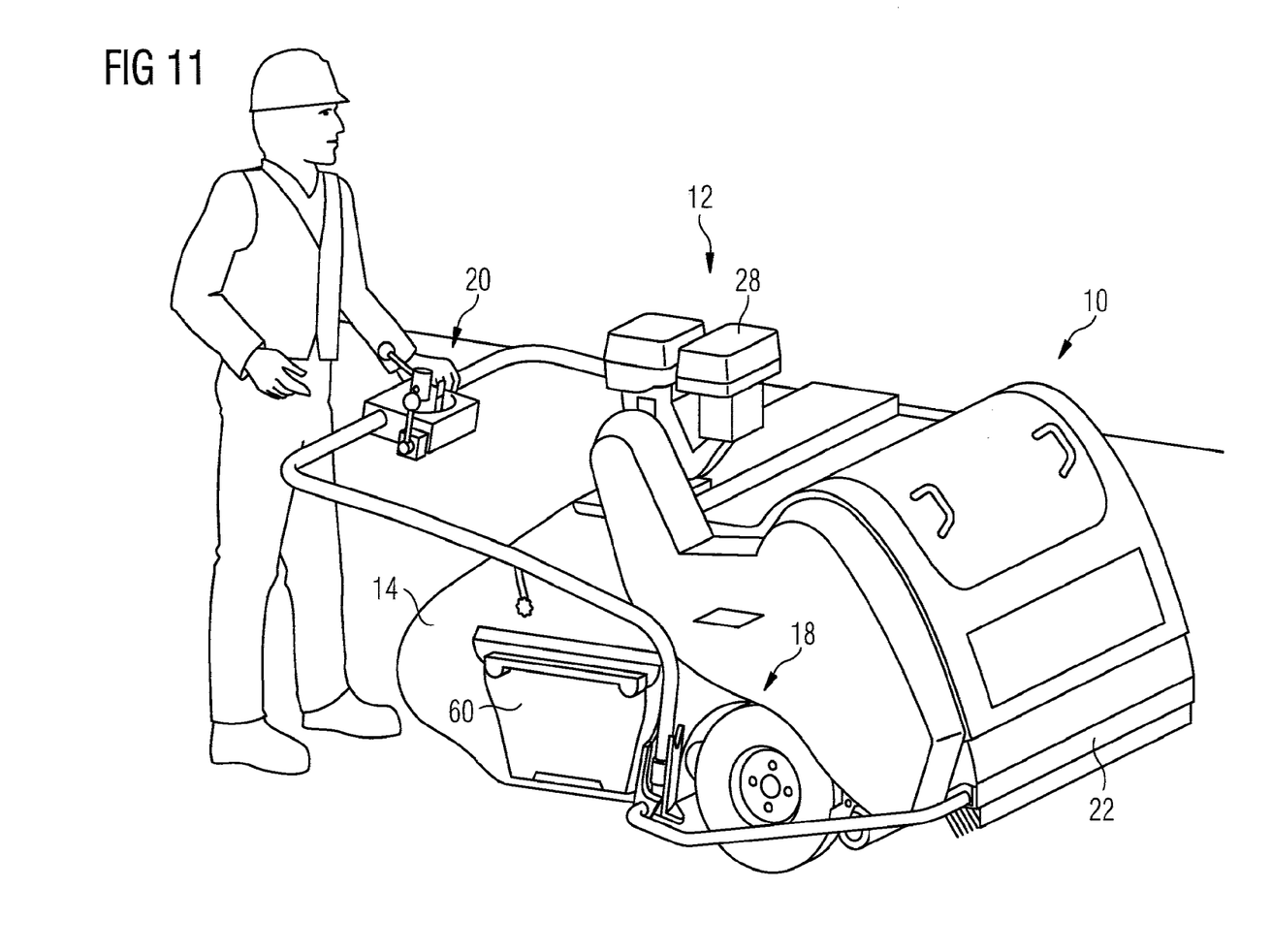
FIGS. 11 and 12 show perspective views of the ground maintenance machine of FIGS. 1, 9 and 10.
Figure 12:
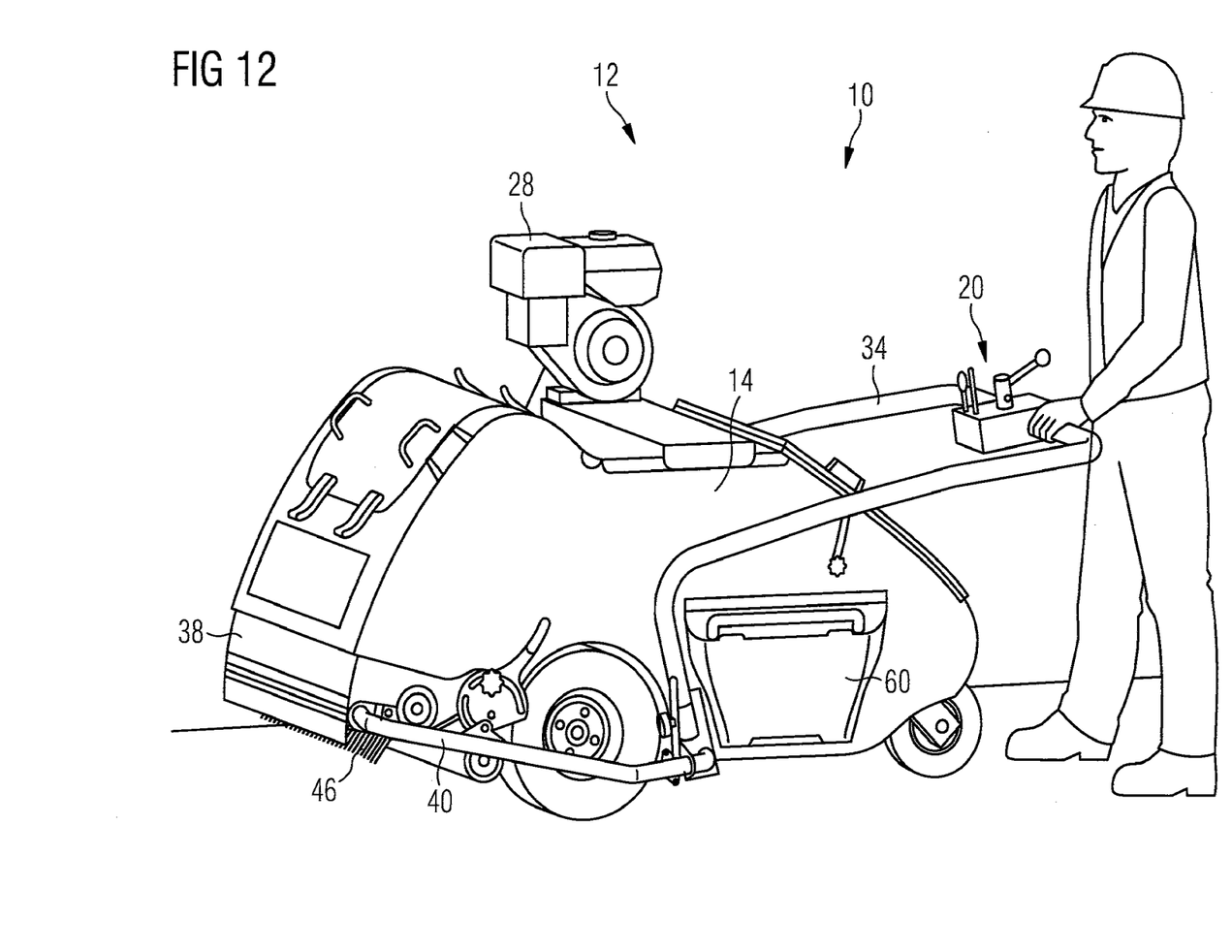
Figure 13:
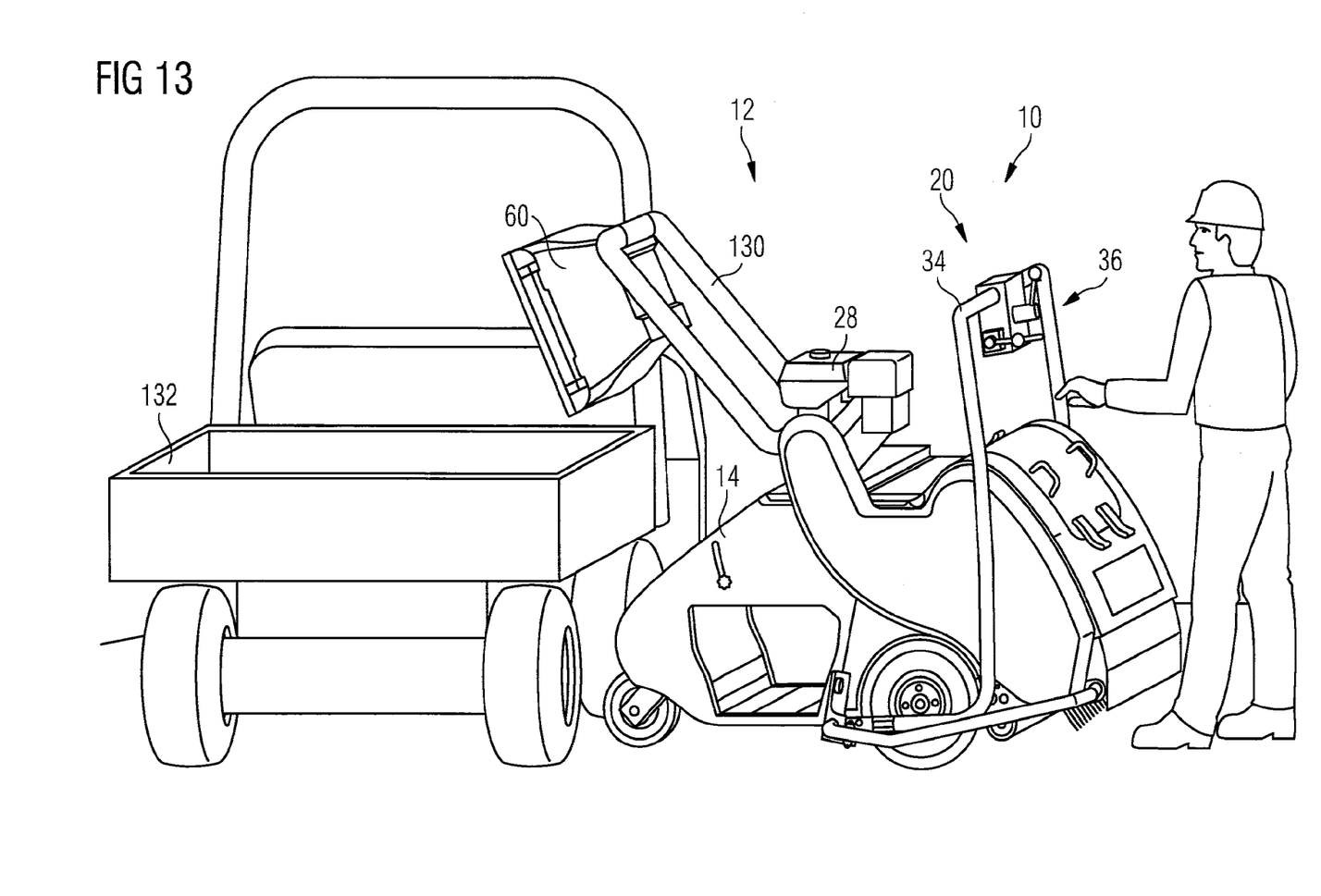
FIG. 13 shows a schematic perspective representation of the ground maintenance machine during an emptying operation, raised emptying according to a first embodiment being used.
Figure 14:
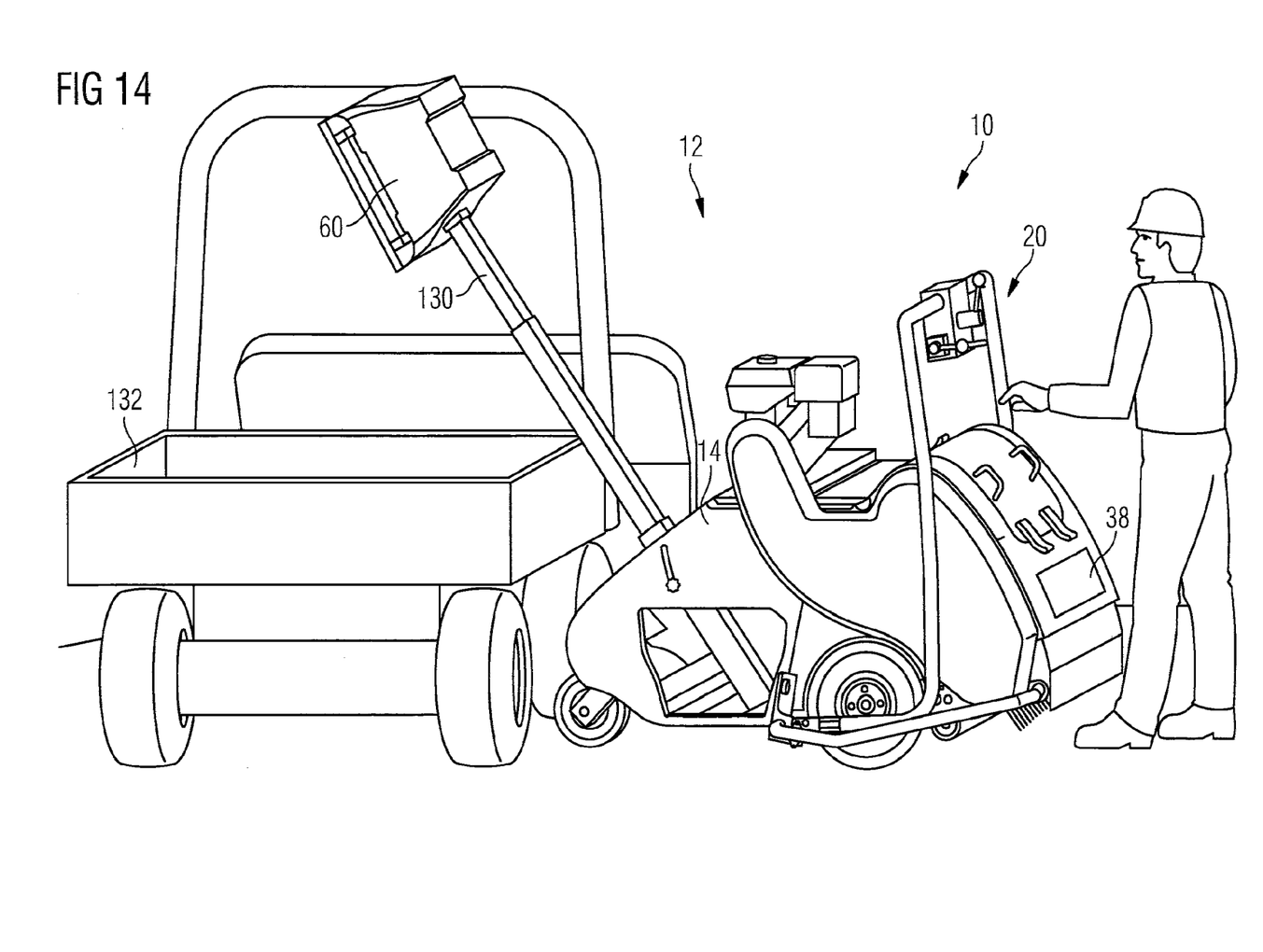
FIG. 14 shows a representation, comparable to FIG. 13, with a ground maintenance machine with raised emptying according to a second embodiment.
Figure 15:
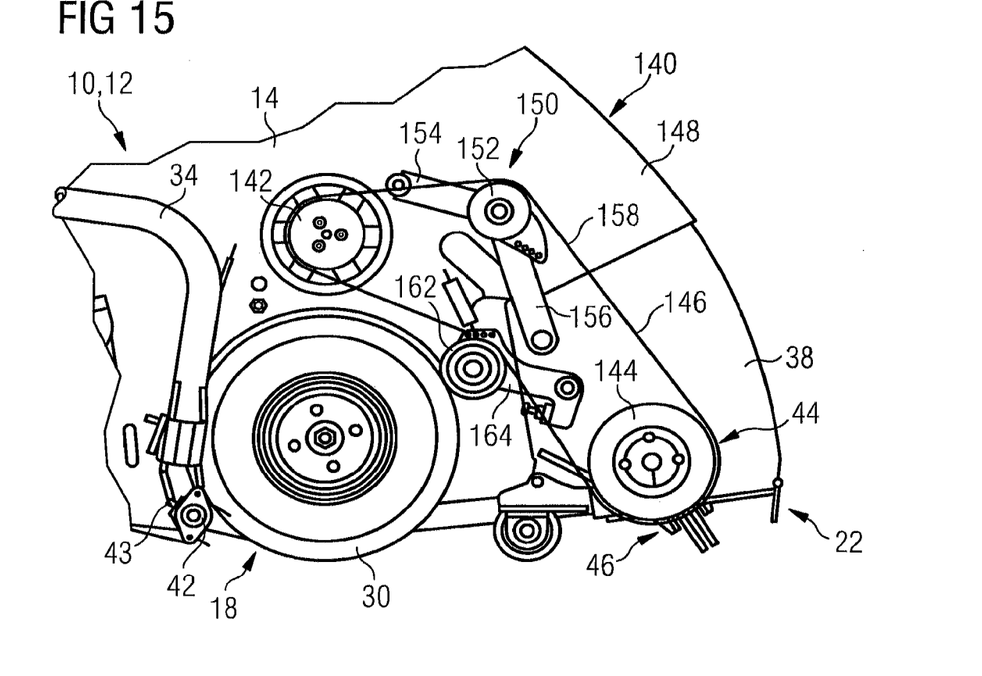
FIG. 15 shows a schematic side representation of a regeneration head of the maintenance machine of FIG. 1 showing a drive, the regeneration head being situated in the operating position.
Figure 16:
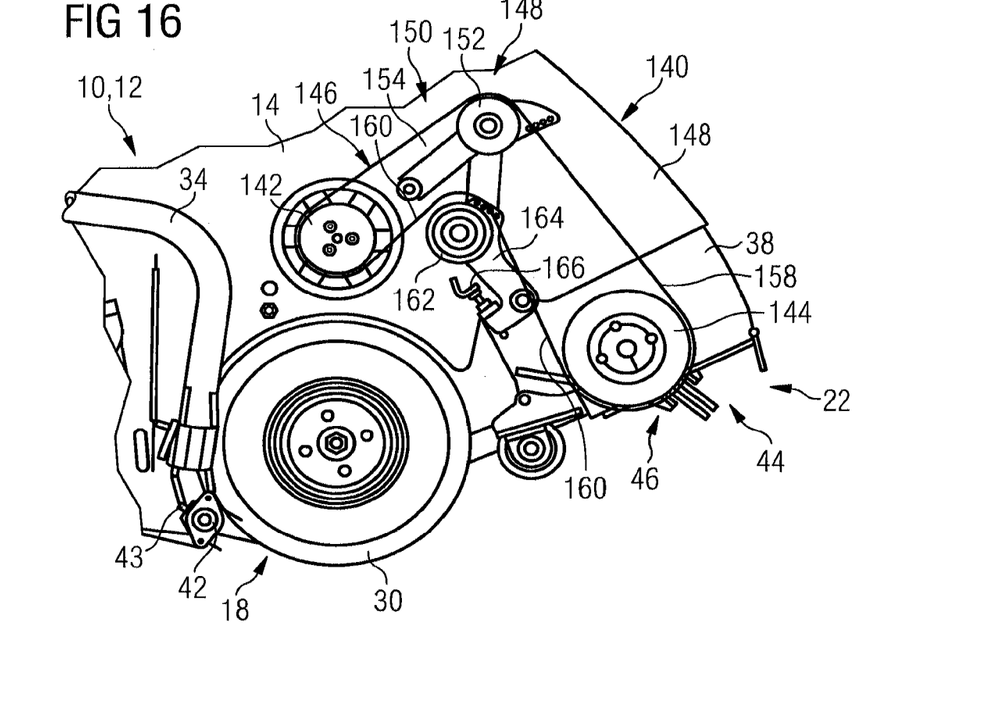
FIG. 16 shows a schematic representation of the regeneration head of FIG. 15, the regeneration head being situated in a mobile position.

FIGS. 11 and 12 show perspective representations of the cleaning machine 12 in operation. FIGS. 13 and 14 show the coarse particle container 60 being emptied, two different embodiments of raised emptying 130 being shown in FIGS. 13 and 14, by which the coarse particle container 60 can be raised out of the machine and moved upwards in order to tip the coarse particle container out above a conveying vehicle 132. FIGS. 15 and 16 show a belt drive 140 for the pick-up 144 on the regeneration head 38. The belt drive 140 has a drive pulley 142 which is mounted on the chassis 14, a driven pulley 144 which is mounted on the regeneration head 38, a drive belt 146 and a belt tightening mechanism 148. The belt tightening mechanism 148 has a guide roller 152 which is mounted on a toggle lever 150. The toggle lever 150 has a carrying lever 154 which is coupled to the chassis 14 and a support lever 156 which is coupled to the regeneration head 38, the support lever 156 and the carrying lever 154 being coupled to each other so as to be pivotable with respect to each other on the roller axis of the guide roller 152. By moving the regeneration head 38 upwards, the toggle lever 150 is pivoted outwards in order, in this way, to compensate for elongation of a taut belt run 158 of the drive belt 146.

A spring-loaded tightening roller 162 cooperates with a slack belt run 160 of the drive belt 146. The tightening roller 162 is mounted on a tightening roller carrier 164 which is pivotably mounted on the regeneration head 38. The pivoting movement of the tightening roller carrier 164 is pre-tightened in the tightening direction of the V-belt by a spring. When the regeneration head 38 moves upwards, the tightening roller carrier 164 strikes against a stop 166 such that the preliminary tension of the spring of the tightening roller carrier 164 is interrupted when there is a movement upwards and the slack belt side 160 has less tension. Thus, the drive belt 146 no longer cooperates under tension with the pulleys 142, 144 such that the belt drive 140 of the pick up unit 44 is disengaged when the regeneration head 38 is moved upwards. On the other hand, tensile loads on the taut belt run 158, which occur during ground maintenance, are supported on the regeneration head 38 by the support lever 156 such that such a tensile load does not result in the regeneration head 38 pivoting upwards; i.e. such tensile loads are especially not transmitted to the handle 34. Increased ease of operation of the cleaning machine 12 is produced both by the use of rotary sieves 52 and by the above-described belt tightening device 148.

As can be appreciated from the above, the invention lies, in particular, in the area of ground maintenance and, in particular, in the area of machines for treating grassed areas, sports grounds or parks. In particular, the invention can be used in conjunction with the deep loosening of soils.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "outboard", inboard", "forward", "rearward", "above", "downward", "vertical", "horizontal", "below" and "transverse" as well as any other similar directional terms refer to those directions of a pneumatic tire according to the present invention. Accordingly, these terms, as utilized to describe the present invention should be interpreted relative to a pneumatic tire according to the present invention. The terms of degree such as "generally", "substantially", "about" and "approximately" as used herein mean a reasonable amount of deviation of the modified term such that the end result is not significantly changed. For example, two members that are angled less than ten degrees apart would be considered "generally perpendicular", but two members that are angled more than fifteen degrees apart would not be considered "generally perpendicular".

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A soil plug processing mechanism for processing soil plugs which occur during ground maintenance, the soil plug processing mechanism comprising:
    a separating device configured to perform processing of the soil plugs by separating the soil plug material into fine particles and coarse particles, the separating device including at least one rotatable rotary sieve which has a rotatingly driveable sieve drum with an outside surface which is realized at least partially as a sieve area;
    a plug picking up device configured to pick up the soil plugs and generate air which conveys the soil plugs and discharges the soil plugs into the separating device; and
    a coarse particle container moveably coupled with respect to the separating device and being configured to move under control of the soil plug processing mechanism between a coarse particle receiving position at which the coarse particle container is arranged to receive the coarse particles separated by the separating device and a coarse particle dispensing position at which the coarse particle container is positioned to dispense the coarse particles contained in the coarse particle container out of the soil plug processing mechanism.

2. The soil plug processing mechanism according to claim 1, wherein
    the at least one rotary sieve is mounted so as to be removable and exchangeable without the use of tools.

3. The soil plug processing mechanism according to claim 1, wherein
    the at least one rotary sieve is mounted so as to be at least one of adjustable and movable with reference to the inclination of the axes of rotation.

4. The soil plug processing mechanism according to claim 1, wherein the rotary sieve includes at least one of the following
    at least one circumferential bearing region configured for support on roller elements; and
    at least one circumferential drive region configured to engage with a rotatingly driven rotary member to drive the rotational movement.

5. The soil plug processing mechanism according to claim 4, wherein the at least one bearing region has at least one of the following features
    the bearing region is circumferentially out-of-round;
    the bearing region is at an axial spacing to the drive region; and
    the bearing region is on an outer region of the sieve area of the sieve drum.

6. The soil plug processing mechanism according to claim 4, wherein
    the drive region includes a circumferential ring gear configured to engage with a gear wheel.

7. The soil plug processing mechanism according to claim 1, wherein
    the rotary sieve includes at least one of a first set of different rotary sieves with variously developed sieve areas and a second set of different rotary sieves with different components.

8. The soil plug processing mechanism according to claim 1, wherein
    the at least one rotary sieve defines an opening on each of its two axial end faces, with a first of the openings being configured to pick up the soil plugs and a second of the openings being configured to discharge the coarse particles.

9. The soil plug processing mechanism according to claim 1, wherein
several of the rotary sieves are arranged side by side to rotate.

10. The soil plug processing mechanism according to claim 9, further comprising
a rotary sieve drive device configured to drive the several rotary sieves, the rotary sieve drive device including at least one actively driven driving rotary member configured to drive a first rotary sieve and at least one passively rotatably mounted intermediate rotary member which is configured to engage with two adjacent rotary sieves at the same time to transmit the rotational movement of one of the one rotary sieves to another of the rotary sieves.

11. The soil plug processing mechanism according to claim 1, further comprising
a rotary sieve bearing device configured with the rotatable bearing arrangement of the at least one rotary sieve, the rotary sieve bearing device including a rotary sieve frame which is movable on a chassis of the soil plug processing mechanism.

12. The soil plug processing mechanism according to claim 11, wherein the rotary sieve bearing device comprises at least one of
a displacement device configured to displace the rotary sieve frame in relation to the chassis;
a pivoting device configured to pivot the rotary sieve frame in relation to the chassis; and
an axial guiding device configured to limit or prevent an axial movement of the at least one rotary sieve in relation to the rotary sieve bearing device.

13. The soil plug processing mechanism according to claim 1, wherein
the plug picking up device is mounted to move up and down in relation to a chassis to provide a manual guiding device configured to manually guide the soil plug processing mechanism over the ground, with the manual guiding device being connected to the plug picking up device to move plug picking up device up and down.

14. The soil plug processing mechanism according to claim 1, further comprising
a fine particle removal device configured to remove and deposit the fine particles on the ground.

15. The soil plug processing mechanism according to claim 1, wherein
the coarse particle receiving position is disposed vertically lower than the separating device and the coarse particle dispensing position is positioned vertically higher than the separating device.

16. A rotary sieve for a soil plug processing mechanism according to claim 1.

17. A ground maintenance machine which is mobile or configured to attach to a vehicle, the ground maintenance machine including a soil plug processing mechanism according to claim 1.

18. A belt tightening mechanism for a belt drive, the belt tightening mechanism being configured for use with a soil plug processing mechanism for processing soil plugs which occur during ground maintenance, the soil plug processing mechanism comprising a separating device configured to perform the picking up and processing of the soil plugs by separating the soil plug material into fine particles and coarse particles, the separating device including a plug picking up device configured to pick up the soil plugs and at least one rotatable rotary sieve which has a rotatingly driveable sieve drum with an outside surface which is realized at least partially as a sieve area,
the belt tightening mechanism being configured to drive a rotary element which is mounted so as to be movable in relation to a drive unit, with a guide roller which is mounted on a toggle lever, and the toggle lever being mounted at the one end on a carrying part which has the drive unit and at the other end on a carrying part which has the rotary element to be deflected by the relative movement of the carrying parts for tightening a belt run of a belt which is guided about the guide roller and configured to drive the plug picking up device.

19. A soil plug processing mechanism for processing soil plugs which occur during ground maintenance, the soil plug processing mechanism comprising:
a separating device configured to perform the picking up and processing of the soil plugs by separating the soil plug material into fine particles and coarse particles, the separating device including a plug picking up device configured to pick up the soil plugs and at least one rotatable rotary sieve which has a rotatingly driveable sieve drum with an outside surface which is realized at least partially as a sieve area; and
a belt tightening mechanism for a belt drive that is configured to drive the plug picking up device, the belt tightening mechanism being configured to drive a rotary element which is mounted so as to be movable in relation to a drive unit, with a guide roller which is mounted on a toggle lever, and the toggle lever being mounted at the one end on a carrying part which has the drive unit and at the other end on a carrying part which has the rotary element to be deflected by the relative movement of the carrying parts for tightening a belt run of the belt which is guided about the guide roller.

* * * * *